UNITED STATES PATENT OFFICE.

CHARLES RICHTER, OF ST. PAUL, MINNESOTA.

PROCESS OF PREPARING A SOLUTION FOR DYEING OR STAINING LEATHER.

SPECIFICATION forming part of Letters Patent No. 260,417, dated July 4, 1882.

Application filed March 8, 1882. (No specimens.)

*To all whom it may concern:*

Be it known that I, CHARLES RICHTER, of St. Paul, in the county of Ramsey and State of Minnesota, have invented a new and useful Process of Preparing a Solution for Dyeing or Staining Leather, of which the following is a specification.

Prepare a clay mixture by filling a barrel or other vessel half-full of clay, (preferably clay suitable for making bricks.) Then add water sufficient to thoroughly reduce the clay, destroying its adhesive qualities and forming a mixture of thick or semi-liquid condition. Then mix therewith the following ingredients, in substantially the following proportions, viz: To every thirty-two gallons of the clay-and-water mixture add four quarts of common salt, one pint of sulphuric acid, and presently add one quart of brewer's yeast, and thoroughly incorporate them. An effervescence will ensue and continue for about twenty-four hours, and when it ceases the liquid compound will begin to precipitate. Then remove the impurities deposited and leave the supernatant water, and fill the barrel or other vessel with water and dissolve therein six ounces of alum to every thirty-two gallons of liquid. Then add to this mixture one pound of hemlock extract and one pound of terra-japonica thoroughly dissolved in hot water. Apply to the hides, after being tawed and dressed, by pouring the mixture over them when in a close vessel, so as to cover them, and keep about thirty-four hours in solution.

What I claim as my invention, and desire to secure by Letters Patent, is—

The hereinbefore-described process of forming a solution for dyeing or staining leather, consisting in mixing clay, water, common salt, sulphuric acid, brewer's yeast, alum, hemlock extract, and terra-japonica, substantially as set forth.

CHARLES RICHTER.

In presence of—
 ALVA L. ROE,
 ANGIER AMES.